E. J. LORING.
ADJUSTABLE DEVICE FOR YIELDINGLY HOLDING BEVELED GEARS.
APPLICATION FILED JAN. 11, 1907.
937,831.
Patented Oct. 26, 1909.
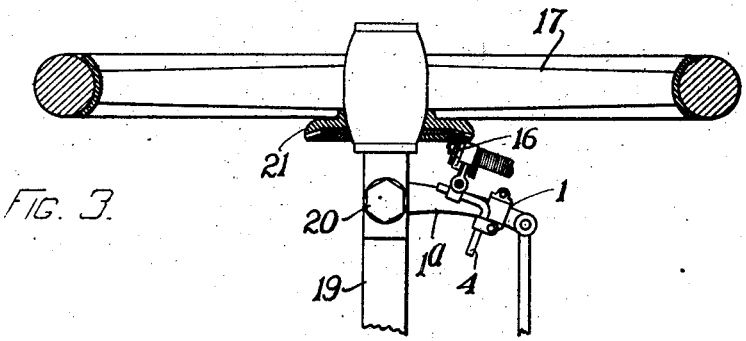
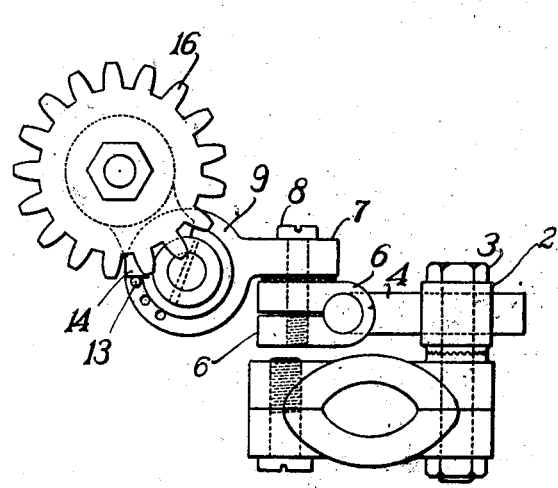
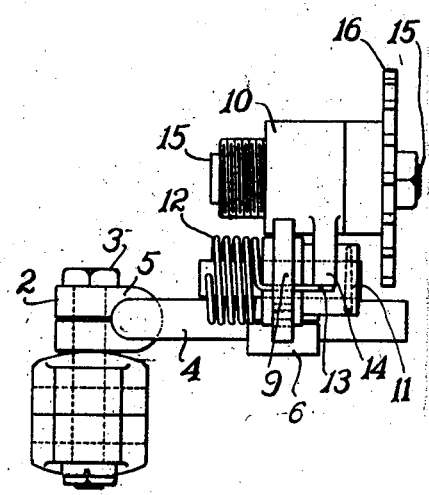
WITNESSES
INVENTOR

UNITED STATES PATENT OFFICE.

ERNEST J. LORING, OF SOMERVILLE, MASSACHUSETTS.

ADJUSTABLE DEVICE FOR YIELDINGLY HOLDING BEVELED GEARS.

937,831. Specification of Letters Patent. Patented Oct. 26, 1909.

Application filed January 11, 1907. Serial No. 351,768.

*To all whom it may concern:*

Be it known that I, ERNEST J. LORING, a citizen of the United States, residing at Somerville, county of Middlesex, and State of Massachusetts, have invented certain new and useful Improvements in Adjustable Devices for Yieldingly Holding Beveled Gears, reference being had therein to the accompanying drawings.

My invention relates to an adjustable device for yieldingly holding beveled gears in mesh with each other and for adjusting the depth and alinement of one of said beveled gears to correctly enmesh with the other.

In the drawings accompanying this specification and forming a part thereof:—Figure 1 represents a side elevation of my adjustable, yielding gear-holding device. Fig. 2 is a front elevation of the same. Fig. 3 shows my device mounted on the steering knuckle of an automobile so that its gear will enmesh with a gear mounted on the wheel of an automobile for the purpose of operating a speed meter or odometer.

In operation, one of the beveled gears of my device is arranged to be permanently fixed to either the part to operate another, or vice versa the part to be operated, while the other beveled gear is mounted in bearings in my adjustable yielding device.

In the application of the device shown, 1 represents a clamp attached to the lever 1ᵃ on the steering fork of an automobile and has secured to it the adjustable split-bearing 2 by means of the bolt 3.

4 is a round rod bent L-shaped, one end of which is mounted in the hole 5 in the part 2, while its other end has mounted upon it an adjustable bearing 6. Said adjustable bearing has in turn adjustably mounted upon it the support 7 by means of the bolt 8. Said bolt 8 is arranged to clamp both the support 7 and the adjustable bearing 6. Said support 7 has a portion 9 at its outer end upon which is rotatively mounted the bearing 10 by means of the pivot pin 11. The movement of the bearing 10 upon the pivot pin 11 is controlled and limited by means of the spring 12, the end 13 of said spring 12 being so positioned that a stop 14 on the bearing 10 will contact with it to limit the rotative movement of said bearing 10.

A shaft 15 is rotatively mounted in the bearing 10. Said shaft 15 has a gear 16 secured on one end, which gear is arranged to rotate the shaft. Suitable means, not shown, may be secured to the other end of said shaft, such as a flexible shaft or the like, for the purpose of operating a speed meter or odometer.

In the drawing Fig. 3, showing the application of my device to the wheel of an automobile, 17 represents the wheel; 19 the axle, and 20 the steering knuckle upon which the wheel 17 is mounted. The bevel gear 21 is secured to the inner face of the wheel 17 so the gear 16 can be adjusted to enmesh with it.

The operation of my device is as follows:—In applying my device to an automobile the gear 21 is attached to the spokes of the wheel 17, and the adjustable device to the steering lever 1ᵃ by means of the clamp 1; thereafter the gear 16 is adjusted to properly enmesh with the gear 21 by loosening the bolts 3 and 8 and swinging the device upon the split bearings 2 and 6 to get the proper angle of the gear 16 with the gear 21 and by sliding it upon the L-shaped rod to bring the gears into alinement and the teeth to properly enmesh with each other. After the proper alinement is made the gear 16 is pressed against the face of the gear 21 to revolve the bearing 10 upon the pivot 11 so that the stop 14 will be pushed away from the end 13 of the spring 12, which movement will increase the tension of the spring so that it will act to yieldingly hold the gears in mesh. The purpose of the spring 12 is to prevent the breaking of the gears should anything accidentally fall between them, in which event the spring would yield, and the bearing 10 revolve upon the pivot 11 against the tension of the spring 12 to allow such article to pass between the teeth of the gears without injury to either, and when said article has passed out from between the gears they will revolve through means of the spring 12 into mesh again and thereafter perform their normal functions. The purpose of the stop 14 and the end 13 of the spring 12 is to provide a stop which will prevent the spring from forcing the teeth of the gears or driving mechanism into too close a contact, as otherwise there would be excessive wear and noise due to the bottoming of the gear teeth. The adjusting means permits the gears or other driving apparatus to be exactly alined and adjusted as to proper contact, and the yielding spring 12 serves to keep the driving means or gears in proper contact unless they are forcibly separated through anything accidentally falling between said driving means.

My invention is not limited to the exact form or arrangement of the parts, as they may be varied without departing from the spirit of my invention.

What I claim is:—

1. An adjustable clamping device comprising a clamping member; a frictional holding member pivotally secured to said clamping member, and rotatable on said pivot; an L-shaped support rotatively and slidably secured in said frictional holding member at one end; a second frictional holding member rotatively and slidably mounted on the other end of said L-shaped support; and a bearing for a driven member adjustably mounted on said second frictional holding member.

2. An adjustable clamping device, comprising a clamping member; a frictional holding member adjustably mounted on said clamping member; an L-shaped support rotatively and slidably secured in said frictional holding member, at one end; a second frictional holding member rotatively and slidably mounted on the other end of said L-shaped support; a bearing adjustably mounted on said second frictional holding member; a second bearing rotatably mounted on said first-mentioned bearing and adapted to have mounted thereon a driven member; and a spring for controlling the rotative movement of said second bearing.

3. An adjustable clamping device, comprising a clamping member; a frictional holding member adjustably mounted on said clamping member; an L-shaped support rotatively and slidably secured in said frictional holding member at one end; a second frictional holding member rotatively and slidably mounted on the other end of said L-shaped support; a bearing adjustably mounted on said frictional holding member; a shaft mounted in said bearing; a driven member secured to said shaft; a driving member; and means for yieldingly holding said driven member in contact with the driving member.

4. An adjustable gear supporting device, comprising a clamping member and a bearing; frictional and positive clamping devices interposed between said clamping member and said bearing, arranged to provide for an adjustment of the bearing in all directions.

5. A yielding adjustable gear supporting device, comprising a clamping member; a bearing adapted to have a shaft rotatively mounted therein; an adjustable clamping member to which said bearing is rotatively secured; a spring for controlling and limiting the rotative movement of said bearing; and universally supporting means interposed between said first and said second clamping members.

6. A yielding adjustable gear supporting means, comprising a bearing arranged to have a shaft rotatively mounted therein; an adjustable clamping device to which said bearing is oscillatably pivoted; a stop; and a spring to control and limit the oscillatory movement of said bearing.

In testimony whereof, I have hereunto set my hand, in the presence of two subscribing witnesses, this the 9th day of Jan., A. D. 1907.

ERNEST J. LORING.

Witnesses:
ARTHUR P. HARDY,
RICHARD P. ELLIOTT.